Figure 1:
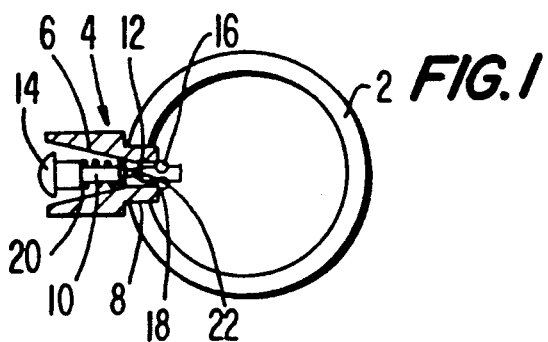

United States Patent
Arentoft et al.

[11] Patent Number: 5,101,769
[45] Date of Patent: Apr. 7, 1992

[54] DRINKING VALVE FOR FUR CAGES

[75] Inventors: Mogens Arentoft, Billund; Jörgen D. Jensen, Solbjerg, both of Denmark

[73] Assignee: Forelco Billund A/S, Billund, Denmark

[21] Appl. No.: 613,541

[22] PCT Filed: May 26, 1989

[86] PCT No.: PCT/DK89/00137

§ 371 Date: Nov. 26, 1990

§ 102(e) Date: Nov. 26, 1990

[87] PCT Pub. No.: WO89/11218

PCT Pub. Date: Nov. 30, 1989

[30] Foreign Application Priority Data

May 26, 1988 [DK] Denmark .............................. 2866/88

[51] Int. Cl.$^5$ ................................................ A01K 7/00
[52] U.S. Cl. .................................................. 119/72.5
[58] Field of Search ................. 119/72.5; 251/339, 122

[56] References Cited

U.S. PATENT DOCUMENTS

| | | | |
|---|---|---|---|
| 1,454,284 | 5/1923 | Holmes | 119/72.5 |
| 3,418,977 | 12/1968 | Godshalk | 119/72.5 |
| 3,646,955 | 3/1972 | Olde | 119/75 X |
| 4,320,891 | 3/1982 | Cairns | 251/339 X |
| 4,633,816 | 1/1987 | Ove et al. | 119/72.5 |

FOREIGN PATENT DOCUMENTS 200847 6/1983 Netherlands .......................... 119/75

Primary Examiner—Gene Mancene
Assistant Examiner—Thomas Price
Attorney, Agent, or Firm—Antonelli, Terry, Stout & Kraus

[57] ABSTRACT

In rows of mink cages in mink farms it is characteristic that the animals relieve nature in the same end of the cages in which the animals' drinking valves are mounted, and the surplus water from the drinking valves, therefore, gets mixed with the manure, whereby the required manure tanks have to be much larger than necessary for the mere collection of the manure. According to the invention the drinking valves (4) are designed so as to produce a minimum of surplus water, but it is an associated risk that the valves may then fail to function in case of even quite small foreign bodies occurring in the watering water. For minimizing this risk the valve is designed such that the valve body (10), in an intermediate position thereof, allows for an essentially increased through-flow, which in normal use will occur briefly only, but nevertheless will be sufficient to cause a cleaning of the valve; the valve, therefore, can remain operative with a minimum of produced surplus water, whereby the manure tank can be made with a significantly reduced size.

2 Claims, 1 Drawing Sheet

DRINKING VALVE FOR FUR CAGES

The present invention relates to a drinking valve for fur cages.

It is an urgent environmental problem that in large mink farms considerable quantities of manure produced, which ought to be handled properly in order simply to rule out said environmental problems, and the trend is towards making use of proper liquid manure tanks for collection of the droppings. These are conveyed from elongated deposit zones below the existing rows of mink cages, as it turns out that the animals primarily drop the manure at one end of the cages, viz. the end where the drinking valve equipment is located. Therefore it is a matter of a well-defined and comparatively narrow deposit zone underneath each row of cages, whereby it is a manageable task to move the solid and liquid manure to the manure tank, applying more or less developed transport systems.

However, it is hereby an unfortunate circumstance that the deposit zones are found just below the area where the drinking valves are placed because falling surplus water gets mixed with the manure every time the animals operate the valves. This water thus forms part of the manure quantity and causes a substantial increase thereof such that the manure tank must be perhaps 3-5 times larger than otherwise required.

It is generally accepted that the drinking valves ought to give more water than strictly necessary for the animals' drinking capacity during use of the valves; this capacity is rather moderate, and if the valve passages are correspondingly narrow they are very prone to becoming blocked by the almost inevitable presence of small particles in the supplied water. As far as the water consumption itself is concerned, it is without special significance whether a certain overdosing takes place, and this at any rate is warranted by its serving to a large extent to prevent blockings of the valves. the said problem of the associated surplus water therefore only occurs in connection with the handling of manure, where the problem in return is exceedingly noticeable. It also forms part of the picture that the surplus water especially in the 'cub season' is brought about by the animals playing with the valves.

The purpose of the invention is to provide a drinking valve which can be operated by the animals without the occurrence of any essential amount of surplus water, such that the quantity of manure is increased only to a very limited extent by falling drinking water. It is hereby a task to provide an applicable valve which has a limited flow-through without being easily blockable.

The invention is based on the considerations that the animals operate the valves in two different ways, viz. either by a rather short push or tilt movement of a protruding valve body of the valve, just sufficiently to open the valve, or—especially during play—by pressing the valve body completely home. Based on this it will be possible in accordance with the invention to provide a valve, which in both its initially opened and its completely 'open' position only is able to supply a very limited quantity of water, while in an intermediate position it can deliver a comparatively large quantity through the same water passage, viz. such that the passage hereby be flushed clean from possible sediments. Such a flushing will only take place almost momentarily at the said full pressing home of the valve body as the animals normally are incapable of keeping the valve body depressed only to the said intermediate position; therefore the occasional flushings will be so brief that they do not amount to any significant use of water, that is water contribution to the manure, respectively.

The invention can be carried into effect in several ways, but it is preferred to use a valve of the type having a spring-loaded valve pin reaching through a valve passage and at the inner end of this passage, which is in connection with a water supply pipe, having a valve head, e.g. consisting of a protruding O-ring, which is held against a valve seat area at the inner end of the valve passage. The animals can open the valve by a tilting or light pushing in of the protruding valve pin, just as they can press the pin entirely home until it hits a stop or until the associated biasing spring is totally compressed. With such a valve, according to the invention, it is arranged such that the valve pin generally is designed with a diameter which is only slightly smaller than the diameter of the valve passage, the pin, however, having a narrowed portion which is slightly longer than the valve passage and which in an intermediate position of the pin is situated just coinciding with the valve passage. In this intermediate position, which is assumed by the pin very briefly during each pressing in and subsequent return from a totally pressed in position, the water gets an opportunity of flowing stronger between the opposite ends of the valve passage along the narrowed portion of the valve pin, whereby possible impurities may be flushed away. Should a blocked valve be observed, it is possible from the outside to rock the valve pin with a finger and retain it a little longer in the flushing position.

The invention is described in more detail in the following with reference to the drawing in which:

FIG. 1 is a lateral sectional view of the valve shown mounted in a drinking water pipe, and FIGS. 2-5 show a variety of positions of the valve pin of the valve.

In FIG. 1 a water pipe of plastic 2 can extend along a row of mink cages, and at each cage having at least one drinking valve 4 comprising a valve housing 6, this at its rear having a conical threaded stub 8, which in a tight manner is screwed into a lateral hole in the pipe 2, and a valve pin 10 extending through the housing 6 and through a valve passage 12 in the stub 8. At the front the valve pin comprises a push head 14 and at the rear a valve head in the form of a protruding O-ring 16 cooperating with a rear seat area 18 on the stub 8. At its front the pin 10 is surrounded by a spring 20 pushing the pin 10 forwardly to a closed position of the valve portions 16, 18. The animals are able to open the valve by pressing the push head 14.

So far specified it is a matter of a well-known valve construction, and the special feature of the valve according to the invention is that the radial clearance between the valve pin 10 and the valve passage 12 is very small, e.g. only 0.1 mm, and that in the pin 10 there is provided a peripheral recess 22 situated in front of and partly projecting into the valve passage 12.

With the said small clearance is endeavored to procure a very small flow-through preferably only approx. 0.5 mm$^2$, such that in both slightly opened and completely opened positions is only able to supply water at a rate that complies approximately with the drinking capacity of the animals. It could be desirable to work with a narrower valve passage and thus a somewhat larger radial clearance, but it has been found important to maintain a fairly large diameter of the valve pin 10 with the purpose that said pin, normally consisting of brass, in winter can act noticeably heat conducting between heated water in the pipe 2 and the interior of the valve housing 6 such that this may thereby be kept frost-proof.

Figure 2:
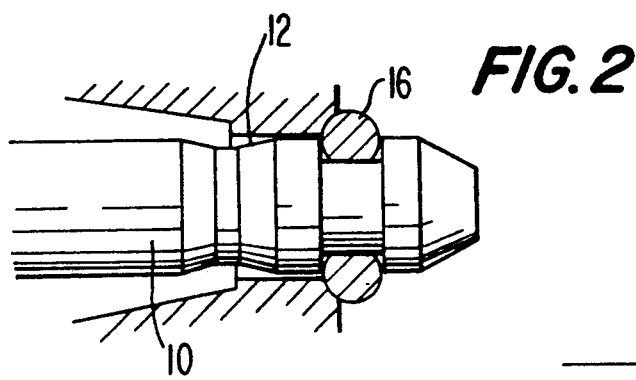
Figure 3:
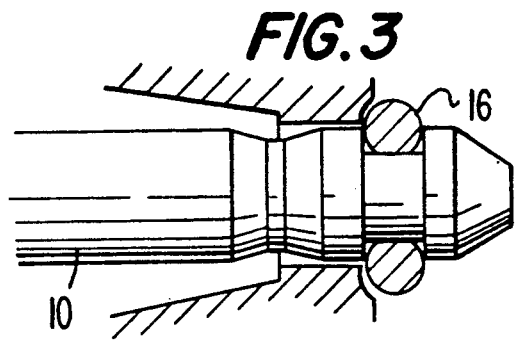

FIG. 2 shows the valve in shut position. It should be realized that the valve can be opened to normal outflowing or trickling of water by an extremely small actuation movement of the push head 14, and besides a corresponding opening can be obtained by a transverse displacement of the push head, whereby the valve pin 10 as shown in FIG. 3 is brought to tipping sufficiently for the O-ring 16 to rise a little from part of the seat 18. When the push head 14 is released the spring 20 acts to return the valve pin to shut position.

Figure 4:
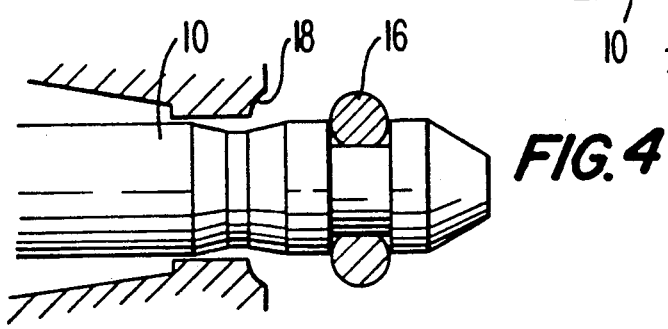

If the push head is subjected to a real inwardly directed pressing force, the valve pin 10 is relatively easily pressed home, which corresponds to the position shown in FIG. 4. The peripheral recess 22 is here pushed inwardly along the passage 12 such that the passage again to a large extent is filled by the valve pin 10 for continued significant limitation of the outflow.

Figure 5:
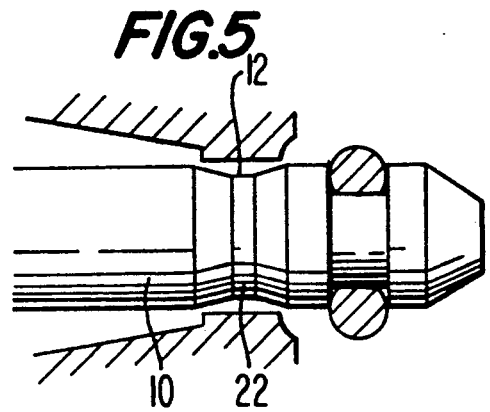

In the intermediate position shown in FIG. 5 the peripheral recess 22 is situated exactly opposite the valve passage 12. It is seen that the passage 12 is longer than the recess 22 and therefore an essentially heavier flow-through can take place, whereby possible deposited impurities can be flushed away. This position will normally only be taken up very briefly during the inward and outward movement of the valve pin between fully closed and fully open states when the animals operate the valve, but by applying a light finger touch one can retain the valve pin in this position and even rock it gently to clean the valve, if it is observed that the valve is blocked or barred from shutting.

It should be mentioned that from WO 84/04655 a so-called bite valve for large animals is known, where it is ensured that the valve supplies sufficient drinking water in an intermediate position of the valve body, while it is almost fully shut when the valve body is led to fully activated position. It is expected that the animals will learn to drink in "gulps" as the normal flow of drinking water will be supplied in an intermediate phase every time the valve body is moved between shut position and the final position. Hereby a waste of water is counteracted, but the situation where the operative water flow-through is "weak" does not occur at all, and neither is supplied even much more water in the intermediate phase than matches the animals' drinking capacity. Functionally the known valve differs considerably from the present valve, and it must therefore be emphasized that the present valve is especially intended for small fur-bearing animals such as mink. In the light of this the right to alter the object of invention into "fur farm with drinking valves" is reserved.

We claim:

1. A drinking valve for fur cages, comprising a valve housing with a valve passage having inner and outer ends and through which a valve pin extends, said valve pin having a first outer end exposed to the animals which is susceptible to tilting or inward pushing by animals for moving the valve pin relative to the valve passage and valve housing, and said pin at a location spaced inwardly from said first, outer end thereof, has a valve head for cooperation with a valve seat at the inner end of the valve passage, which is connected to a watering pipe, wherein the valve pin fills the valve passage so widely that only a flow-through area of the magnitude 1 mm$^2$ or less remains, when the valve pin is established both at a first position from only an initial pushing inward of the valve pin and at a second position from a total permissible pressing inward of the valve pin by the animals, and said pin being provided with an axially extending surface recess which enables the water to flow through the valve passage when the valve pin is pressed inwardly to a third position intermediate said first and second positions of the pin, the recess protruding beyond both the inner and outer ends of the valve passage to enable a flow-through area in said third, intermediate position of the valve pin, corresponding to a flow rate substantially exceeding a flow rate at which the relevant animals are capable of drinking.

2. A drinking valve according to claim 1, wherein said axially extending recess has an axial length which is only very slightly larger than the corresponding dimension of the valve passage.

* * * * *